US 9,970,986 B2

(12) United States Patent
Hampel et al.

(10) Patent No.: US 9,970,986 B2
(45) Date of Patent: May 15, 2018

(54) INTEGRATED CIRCUIT AUTHENTICATION

(71) Applicant: Cryptography Research, Inc., San Francisco, CA (US)

(72) Inventors: Craig E. Hampel, Los Altos, CA (US); Scott C. Best, Palo Alto, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 371 days.

(21) Appl. No.: 14/640,180

(22) Filed: Mar. 6, 2015

(65) Prior Publication Data
US 2015/0260786 A1 Sep. 17, 2015

Related U.S. Application Data

(60) Provisional application No. 61/951,114, filed on Mar. 11, 2014, provisional application No. 62/045,923, filed on Sep. 4, 2014.

(51) Int. Cl.
| | |
|---|---|
| G11C 5/14 | (2006.01) |
| G01R 31/317 | (2006.01) |
| G06F 21/73 | (2013.01) |
| G01R 31/30 | (2006.01) |

(52) U.S. Cl.
CPC ....... G01R 31/31719 (2013.01); G06F 21/73 (2013.01); G01R 31/3008 (2013.01)

(58) Field of Classification Search
CPC .......... G01R 31/31719; G01R 31/3008; G06F 21/73
USPC ....................................................... 365/226
See application file for complete search history.

(56) References Cited

U.S. PATENT DOCUMENTS

| | | | | | |
|---|---|---|---|---|---|
| 3,914,762 | A | * | 10/1975 | Klensch | B61L 25/045 340/10.1 |
| 6,161,213 | A | * | 12/2000 | Lofstrom | H01L 23/544 257/E23.179 |
| 7,506,183 | B2 | * | 3/2009 | Araya | H01M 10/4207 713/159 |
| 7,554,337 | B2 | * | 6/2009 | Tuyls | H01L 23/544 324/600 |
| 7,715,884 | B2 | * | 5/2010 | Book | H02J 7/0003 320/114 |
| 7,827,413 | B2 | * | 11/2010 | Liardet | G06F 21/73 380/262 |
| 8,063,739 | B2 | | 11/2011 | Kean | |
| 8,418,006 | B1 | * | 4/2013 | Trimberger | G06F 21/10 714/725 |

(Continued)

OTHER PUBLICATIONS

Bhushan et al., "Ring Oscillators for CMOS Process Tuning and Variability Control," IEEE Transactions on Semiconductor Manufacturing, vol. 19, No. 1, Feb. 2006. 9 pages.

(Continued)

Primary Examiner — Viet Q Nguyen
(74) Attorney, Agent, or Firm — Lowenstein Sandler LLP

(57) ABSTRACT

Systems and methods for authenticating integrated circuits. An example integrated circuit may comprise: a plurality of functional units electrically coupled to a power source; and an authenticating circuit comprising a plurality of voltage measurement units, each voltage measurement unit to measure, at one or more frequencies over one or more periods of time, a local voltage at a respective functional unit of the plurality of functional units.

20 Claims, 6 Drawing Sheets

(56) References Cited

U.S. PATENT DOCUMENTS

| | | | | |
|---|---|---|---|---|
| 8,432,250 B2* | 4/2013 | Chmelar | G06F 7/588 | 324/750.15 |
| 8,590,008 B1* | 11/2013 | Ellmore | G06Q 20/108 | 726/19 |
| 8,590,010 B2* | 11/2013 | Fainstein | G06F 21/44 | 324/649 |
| 8,610,454 B2* | 12/2013 | Plusquellic | H04L 9/0861 | 326/8 |
| 8,620,982 B2* | 12/2013 | Potkonjak | G06F 21/73 | 708/208 |
| 8,749,265 B2* | 6/2014 | Kim | G06F 7/588 | 326/8 |
| 9,105,432 B2* | 8/2015 | Kim | H01H 85/0241 | |
| 9,213,396 B1* | 12/2015 | Booth | G06F 13/4291 | |
| 9,690,927 B2* | 6/2017 | Chellappa | G06F 21/44 | |
| 2003/0101378 A1* | 5/2003 | Ohkubo | H01M 10/4257 | 714/37 |
| 2003/0204743 A1* | 10/2003 | Devadas | G06F 21/31 | 726/9 |
| 2004/0125930 A1* | 7/2004 | Bardouillet | G11O 5/00 | 379/183 |
| 2004/0136529 A1* | 7/2004 | Rhelimi | G06F 7/588 | 380/44 |
| 2006/0108972 A1* | 5/2006 | Araya | H01M 10/4207 | 320/106 |
| 2011/0095722 A1* | 4/2011 | Chang | H02J 7/0055 | 320/107 |
| 2012/0037711 A1* | 2/2012 | Kim | G06F 7/588 | 235/492 |
| 2013/0069661 A1* | 3/2013 | Rich | H01M 10/42 | 324/433 |
| 2015/0123702 A1* | 5/2015 | McKinley | H01L 21/265 | 326/8 |

OTHER PUBLICATIONS

Mayes, Keith, "Smart Card Platform Fingerprinting," Securing Cyberspace Workshop IV (SCWS4), Dec. 4-9, 2006, slides 1-28. 28 pages.

Rad et al., "Sensitivity Analysis to Hardware Trojans Using Power Supply Transient Signals," IEEE International Workshop on Hardware-Oriented Security and Trust, Jun. 9, 2008, pp. 3-7. 5 pages.

Tehranipoor et al., "A Survey of Hardware Trojan Taxonomy and Detection," IEEE Design & Test of Computers, vol. 27, No. 1, pp. 10-25, Jan.-Feb. 2010. 16 pages.

* cited by examiner

INTEGRATED CIRCUIT AUTHENTICATION

RELATED APPLICATIONS

This application claims the benefit of U.S. Provisional Application No. 62/045,923 filed Sep. 4, 2014, entitled "Integrated Circuit Authentication" and U.S. Provisional Application No. 61/951,114 filed Mar. 11, 2014, entitled "Anti-Clone Current/Noise Profiling." Both above referenced provisional applications are incorporated herein by reference in their respective entireties.

TECHNICAL FIELD

The present disclosure is generally related to integrated circuits, and is more specifically related to systems and methods for integrated circuit authentication.

BACKGROUND

Various systems may employ anti-counterfeiting devices designed to authenticate the system equipped with such a device, or to authenticate the device itself. Examples include authenticating chips or circuits integrated into printer cartridges, car parts, or aircraft parts. By interrogating an authenticating chip or circuit in a more complex system on chip (SoC), a user or system provider may determine whether the system equipped with the chip has been manufactured by an authorized party and/or at an authorized facility.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
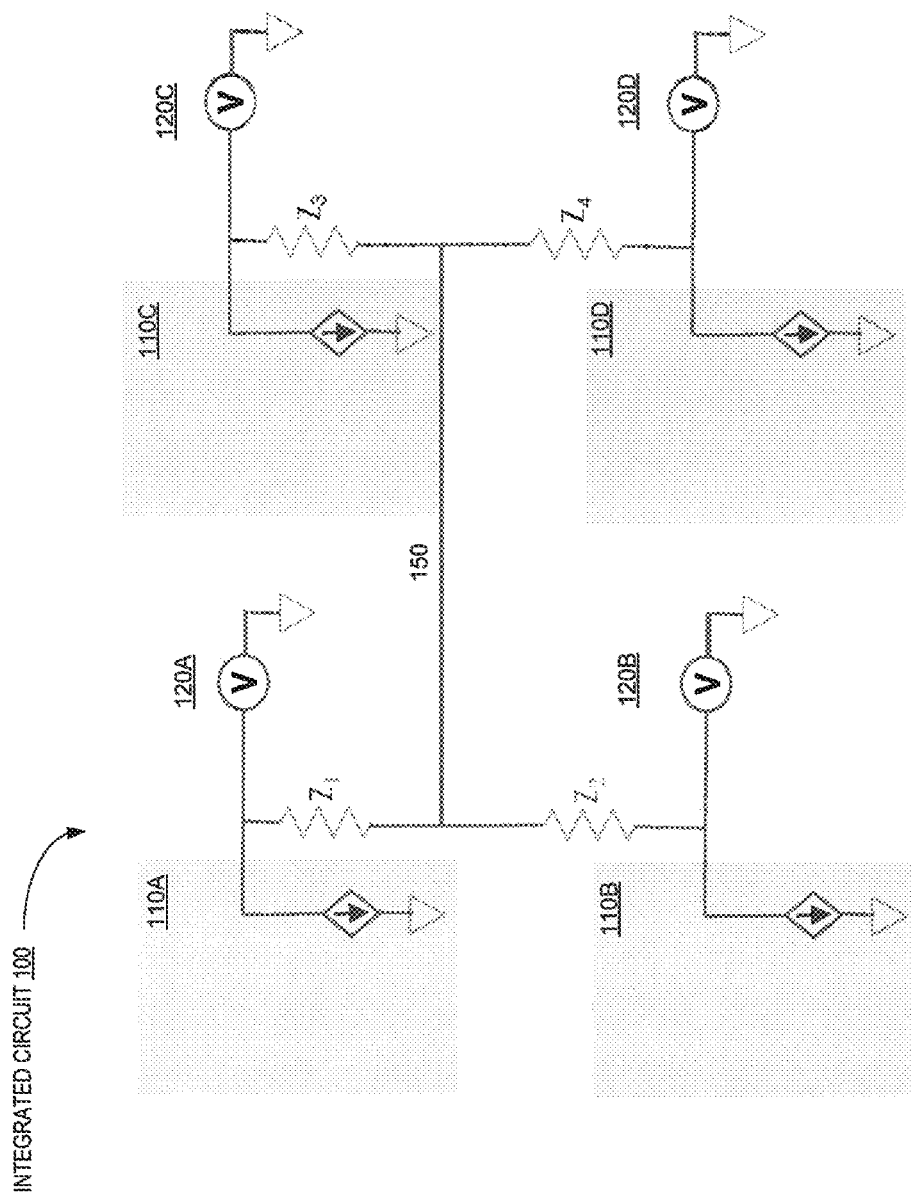
FIG. 1 schematically illustrates a high-level component diagram of an example integrated circuit operating in accordance with one or more aspects of the present disclosure.

Described herein are systems and methods for authenticating integrated circuits.

In various common implementations, an anti-counterfeiting device designed to authenticate a system equipped with such a device would employ an authentication scheme using cryptographic keys. However, a malicious party may attempt to clone an anti-counterfeiting device using the cryptographic keys extracted from a genuine anti-counterfeiting device, and then equip a counterfeited system with the cloned anti-counterfeiting device.

Furthermore, most common anti-counterfeiting methods could not be utilized for confirming the provenance of a device, such as an integrated circuit, i.e., for confirming that the integrated circuit has been manufactured at an authorized manufacturing facility using an authorized technology (such as a specific transistor technology, e.g., 28 nm, 40 nm, etc., a specific number and types of metallization layers, or a specific floor plan).

The present disclosure addresses the above noted and other deficiencies by providing systems and methods for authenticating integrated circuits based on measuring local voltages at certain target frequencies in various areas of the integrated circuit in response to the circuit's performing a certain challenge function, and can be used in conjunction with cryptographic keys to further authenticate the integrated circuit and the system into which the integrated circuit is incorporated. The target frequencies may be aligned with the operating frequencies of the integrated circuit (e.g., one or more target frequencies may be selected as being multiples of the operational frequency of the corresponding integrated circuit).

The spatial and temporary distribution of local voltages at target frequencies in various areas of an integrated circuit in response to the circuit's performing a certain challenge function may be dependent upon the specific process that has been used to manufacture the integrated circuit, as well as the placement of the measurement circuits and hence may be used for confirming with high probability the provenance of the integrated circuit.

Examples of integrated circuits that may be authenticated using the methods described herein include, but are not limited to, memory devices (e.g., SRAM memory), devices implementing the functionality of external buses (e.g., an $I^2C$ bus), devices performing digital computation (e.g., cryptographic engines, or microprocessors executing a sequence of instructions) and other devices.

In accordance with one or more aspects of the present disclosure, an integrated circuit that needs to be authenticated may be divided into a plurality of power domains (nodes) such that each node may comprise one or more input-driven functional units. A plurality of voltage measurement units (collectively referred to as authentication circuit) may be spatially distributed through the integrated circuit die, such that each voltage measurement unit may be located in a physical proximity of a functional unit configured to perform a certain function (e.g., a memory functional unit, a data processing functional unit, or a data transmission functional unit). A measurement unit could be further coupled to a corresponding functional unit by locally isolating the power delivery plane to the functional unit and the authentication unit, and/or by placing the measurement unit near or inside the power regulator for the functional unit.

The functional units within the integrated circuit may be designated either based on the known topology of the integrated circuit die (e.g., a SRAM integrated circuit die may be subdivided into several squares so that each of the four functional units would be associated with certain address and/or data bits of the integrated circuit) or purely arbitrarily (e.g., by subdividing the integrated circuit die into a certain number of squares or other plane shapes without regard to the integrated circuit topology).

Each voltage measurement unit may comprise two or more voltage-controller oscillators (VCOs) and counters configured to measure or count the cycles generated by the VCOs. Each voltage measurement unit may be configured to measure, at target frequencies over certain periods of time, a local voltage at the corresponding functional unit.

In certain implementations, the integrated circuit may further comprise a noise generation circuit including a plurality of noise generation units coupled to the respective functional units. The noise generation circuit may be employed to introduce additional input into the challenge sequence, as described in more details herein below.

The authenticating circuit may be employed to measure a voltage distribution profile of the integrated circuit, at certain target frequencies, in response to the functional units' performing a certain challenge function. The authentication decision may be made based on comparing the actual power profile with an expected power profile.

Thus, the systems and methods described herein may produce an integrated circuit's "fingerprint" which may be utilized to confirm that the integrated circuit has been manufactured by a particular manufacturing facility and/or particular manufacturing process. While copying the functional aspects of a semiconductor circuit may be a straight-forward process, it may be considerably more difficult to copy both the functionality as well as the spatially variant and functionally variant power profile. Various aspects of the methods and systems are described herein by way of examples, rather than by way of limitation.

FIG. 1 schematically illustrates a high-level component diagram of an example integrated circuit 100 operating in accordance with one or more aspects of the present disclosure. The die of the example integrated circuit is shown to include an operating circuit 100 performing, for example, an SRAM function. The circuit may be divided into a plurality of power domains (nodes) such that each node may comprise one or more input-driven functional units 110A-110D (e.g., memory functional units) and a voltage measurement unit 120A-120D. Impedance values $Z_1$-$Z_4$ reflect the impedance between the power plane 150 and the corresponding functional units 110A-110D. The function of integrated circuit 100 is not the focus of the present disclosure, but Static Random Access Memory (SRAM) will be used throughout as an example of an integrated circuit 100 for illustrative purposes.

Each voltage measurement unit 120A-120D may be electrically coupled to a corresponding functional unit or portion of a larger functional unit 110A-110D, and thus may be configured to measure, at one or more target frequencies, over one or more periods of time, the local voltage at the corresponding functional unit 110A-110D. Thus, the authenticating circuit comprising the voltage measuring units may be employed to produce spatially and/or temporally distributed power profile of the integrated circuit 100, in response to the integrated circuit's performing a certain challenge function, as described in more details herein below. In the illustrative example of an SRAM function, the voltage measurement circuit may be associated with a portion of the functional unit (e.g., a specific address range, or a portion of the data of the SRAM, or a combination of both)

In the illustrative example of FIG. 1, each functional unit 110A-110D in is more closely coupled to one of the measurement circuits 120 than it is to other measurement circuits, i.e., the impedances between a given functional unit and each of the measurement circuit are different. Therefore, the current or power consumed by a given functional unit may be measured by different measurement circuits as different voltages. The voltage differences measured in response to a certain challenge may be included into the integrated circuit "fingerprint" employed to authenticate the integrated circuit, as they reflect the impedance values of the power delivery system of the integrated circuit.

Figure 2:
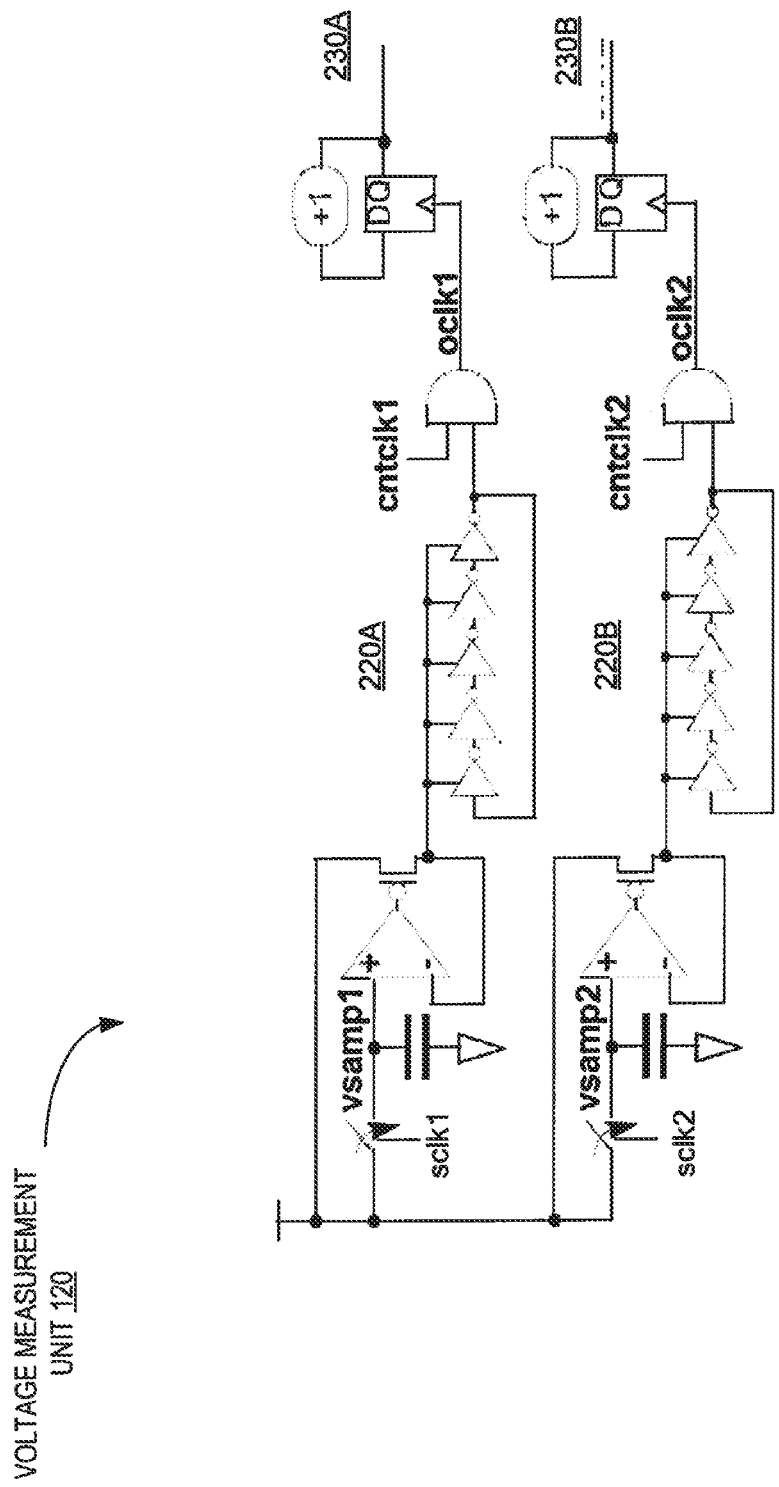
FIG. 2 schematically illustrates a high-level component diagram of an example voltage measurement unit operating in accordance with one or more aspects of the present disclosure.

FIG. 2 schematically illustrates a high-level component diagram of an example voltage measurement unit 120 operating in accordance with one or more aspects of the present disclosure. The example voltage measurement unit 120 may comprise two voltage-controlled oscillators (VCOs) 220A, 220B. The VCOs are each powered by the output of a circuit used to sample and hold the measured voltages vsamp1, vsamp2. As the sampled voltage rises, the respective operating frequencies oclk1, oclk2 of the VCO increase. Signals oclk1 and oclk2 each drive separate counters 230A-230B, values of which (cntclk1 and cntclk2, respectively) are therefore proportional to the respective measured voltages.

Employing two independent VCOs for simultaneously taking two independent voltage measurements, the auto-correlation (frequency response) of the measured voltages can be derived by varying the relative sample time of the two circuits. The voltage measurement unit may further comprise two clock inputs (sclk1 and sclk2) which may be used to sample the measured voltage at two times that are separated from each other by a pre-defined amount of time.

Figure 3:
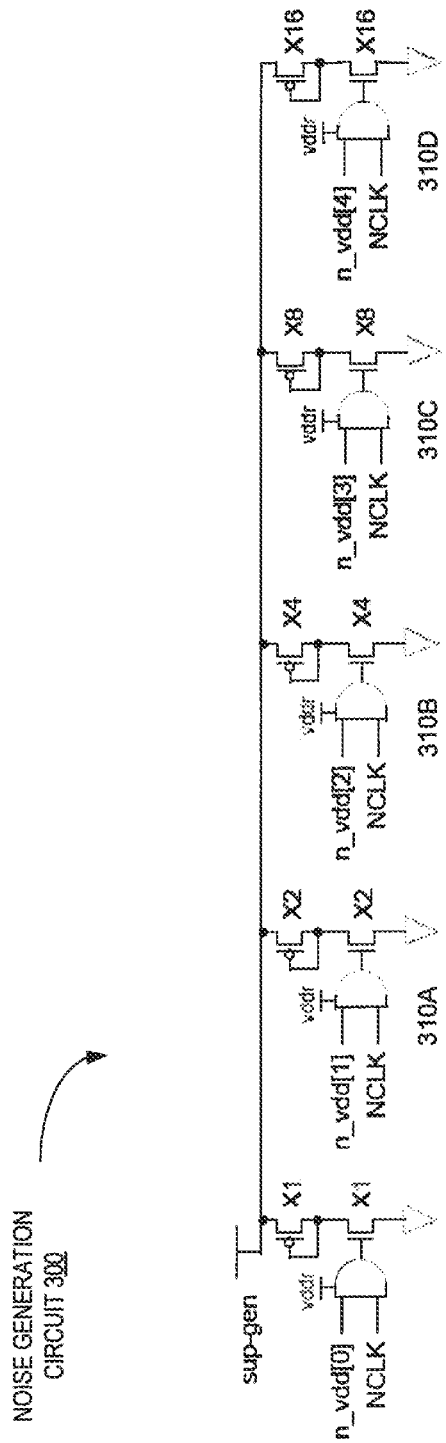
FIG. 3 schematically illustrates an example noise generation circuit that may be utilized to inject on-chip supply noise of controllable amplitudes and frequencies into the example integrated circuit 100, in accordance with one or more aspects of the present disclosure.

In certain implementations, the example integrated circuit 100 may comprise a noise or current generation circuit including a plurality of noise generation units coupled to the respective functional units. The noise generation circuit may be utilized to introduce specific disturbances into the current (and therefore voltage) of the example integrated circuit 100. FIG. 3 schematically illustrates an example noise generation circuit that may be utilized to inject noise of controllable amplitudes and frequencies into the example integrated circuit 100, in accordance with one or more aspects of the present disclosure. The introduced disturbances in current can then be measured by other one the die measurement circuits 120 to further confirm that the floor plan and impedance of the power delivery network between noise sources and measurement circuits closely match that of an authentic device.

As schematically illustrated by FIG. 3, the example noise generation circuit 300 may comprise a series of binary weighted negative channel field effect transistor (nFET) devices 310A-310D that may be programmed to provide different levels of noise (labeled in FIG. 3 as X1, X2, X4, X8 and X16) to the power supply of the integrated circuit 100. "Binary weighted" herein refers to the drive strength of each stage increasing by 2 times for each successive stage (i.e., the drive strength of the each stage is twice stronger than that of the previous stage).

The generated noise is fed onto the sup_gen signal, which may be connected to the power supply plane of the integrated circuit 100 at the location where noise is to be injected. When a noise generation stage is enabled (i.e., by applying a logical "one" at the corresponding n_vdd[#] control input (e.g., n_vdd[0] for stage 0 with drive strength 1x, n_vdd[1] for stage 1 with drive strength 2x, etc.), the shorting devices 310A-310D may be modulated using the NCLK input to the chip. The frequency of NCLK may be varied to introduce different frequency noise to the integrated circuit 100 and measure its resulting impact on the power supply circuit.

Figure 4:
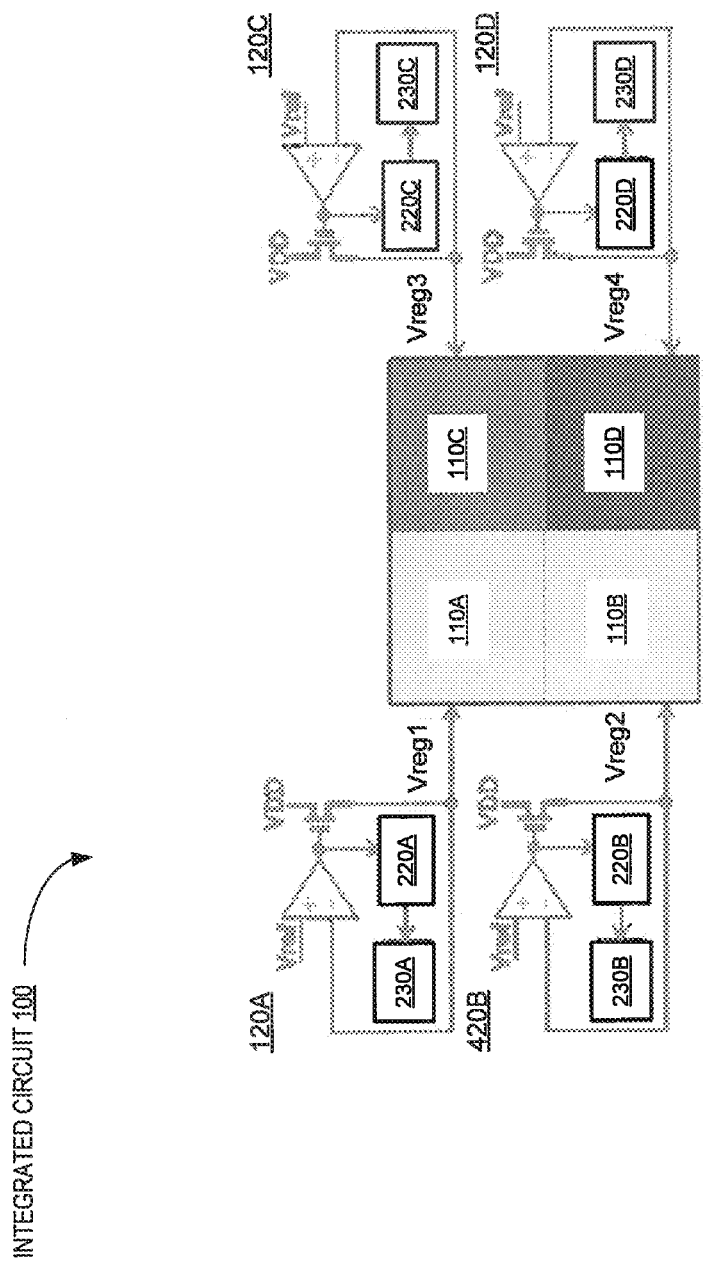
FIG. 4 schematically illustrates an example integrated circuit 100 operating in accordance with one or more aspects of the present disclosure.

In addition to the above described techniques which obtain power profile measurements by measuring voltages drops created by non-zero on-chip impedances, other techniques for power profile measurement can similarly be utilized. FIG. 4 schematically illustrates an example integrated circuit 100 operating in accordance with one or more aspects of the present disclosure. The die of the example integrated circuit 100 may be divided into a plurality of power domains (nodes) such that each node may comprise one or more input-driven functional units 110A-110D (e.g., memory functional units, computational functional units, etc.) and a voltage control unit 120A-120D. Each voltage measurement unit 120A-120D may be electrically coupled to a corresponding functional unit 110A-110D, and thus may be configured to measure, at one or more target frequencies, over one or more periods of time, the regulator's control voltage at the corresponding functional unit 110A-110D. In order to hold the regulator's output voltage Vreg1-Vreg4 approximately constant, the regulator's control voltage must increase during periods of increased power consumption (i.e., during periods of increased work of the circuit under regulation), and decrease during periods of reduced power consumption. Thus, the authenticating circuit comprising the voltage measuring units may be employed to produce spatially and/or temporally distributed power profile of the integrated circuit 100, in response to the integrated circuit's performing a certain challenge function.

Each voltage measurement unit 120A-120D may comprise a voltage-controlled oscillator 220A-220D. The VCO is powered by the difference of the corresponding regulator output voltage VReg1-VReg4 and reference voltage VRef. Outputs of VCOs 220A-220D drive the corresponding counters 230A-230D, values of which therefore reflect the power consumed over one or more periods of time by the respective functional units 110A-110D when the latter are performing computation or other operations associated with a certain challenge function.

Operational parameters of the example integrated circuit 100 may be affected by numerous factors including variations of the outside temperature and variations of the power supply circuit feeding the power to the functional units 110. Hence, the voltage measurement units 120 may be employed to determine quiescent voltages at the corresponding nodes (functional units 110) representing steady-state voltages when no input signals are applied to the functional units. The quiescent point power profile may then be utilized for determining a differential power profile of the example integrated circuit 100, in response to the integrated circuit's performing a certain challenge function, as described in more details herein below.

In order to produce a power profile of the example integrated circuit 100, the voltage measurement units 120 may be programmed for specific target frequencies and measurement time intervals. The target frequencies may be aligned with the operating frequencies of the functional units (e.g., one or more target frequencies of a voltage measurement unit may be selected to be multiples of the operational frequency of the corresponding functional unit). The measurement time intervals may be specified arbitrarily or aligned with operational intervals of the functional units 110 when performing the challenge function. The measurement time intervals of two or more voltage measurement units 120 may be overlapping or non-overlapping, in order to produce a temporally distributed power profile of the example integrated circuit 100.

The power profile of the example integrated circuit 100 may be measured by the authenticating circuit in response to applying a certain challenge function to the functional units 110. The challenge function may comprise a plurality of operations to be performed by the functional units 110. In an illustrative example, the challenge function may comprise a plurality of memory read/write operations utilizing one or more pre-defined data patterns and one or more pre-defined address patterns, such as loading memory locations with certain data and then accessing the memory in a certain sequence that is related to the settings and locations of the voltage measurement circuits. The data and access patterns may be designed to produce local voltage values that are strongly correlated to the particular topology and manufacturing process of the example integrated circuit 100.

Responsive to measuring the power profile of the example integrated circuit 100, a differential power profile of the example integrated circuit 100 may be determined, based on the quiescent point power profile and the actual measured distributed power profile, in order to eliminate variations of the power profile caused by variations of the outside temperature and power supply circuit. Similarly, a differential power profile can be generated by comparing different power domain measurements against each other, rather than to a quiescent power profile. For example, the counters from four independent regions could be sorted from highest to lowest, yielding one of twenty-four possible four-element sort orders.

Responsive to determining the differential power profile of the example integrated circuit 100, an authentication decision may be made based on comparing the measured power profile with an expected power profile. Should the two profiles match, within a pre-defined error margin, the example integrated circuit 100 may be assumed to be produced by the authorized facility using the authorized process. Otherwise, the example integrated circuit 100 or the system using it may be assumed to be a counterfeit and may be discarded or denied operation.

Figure 5:
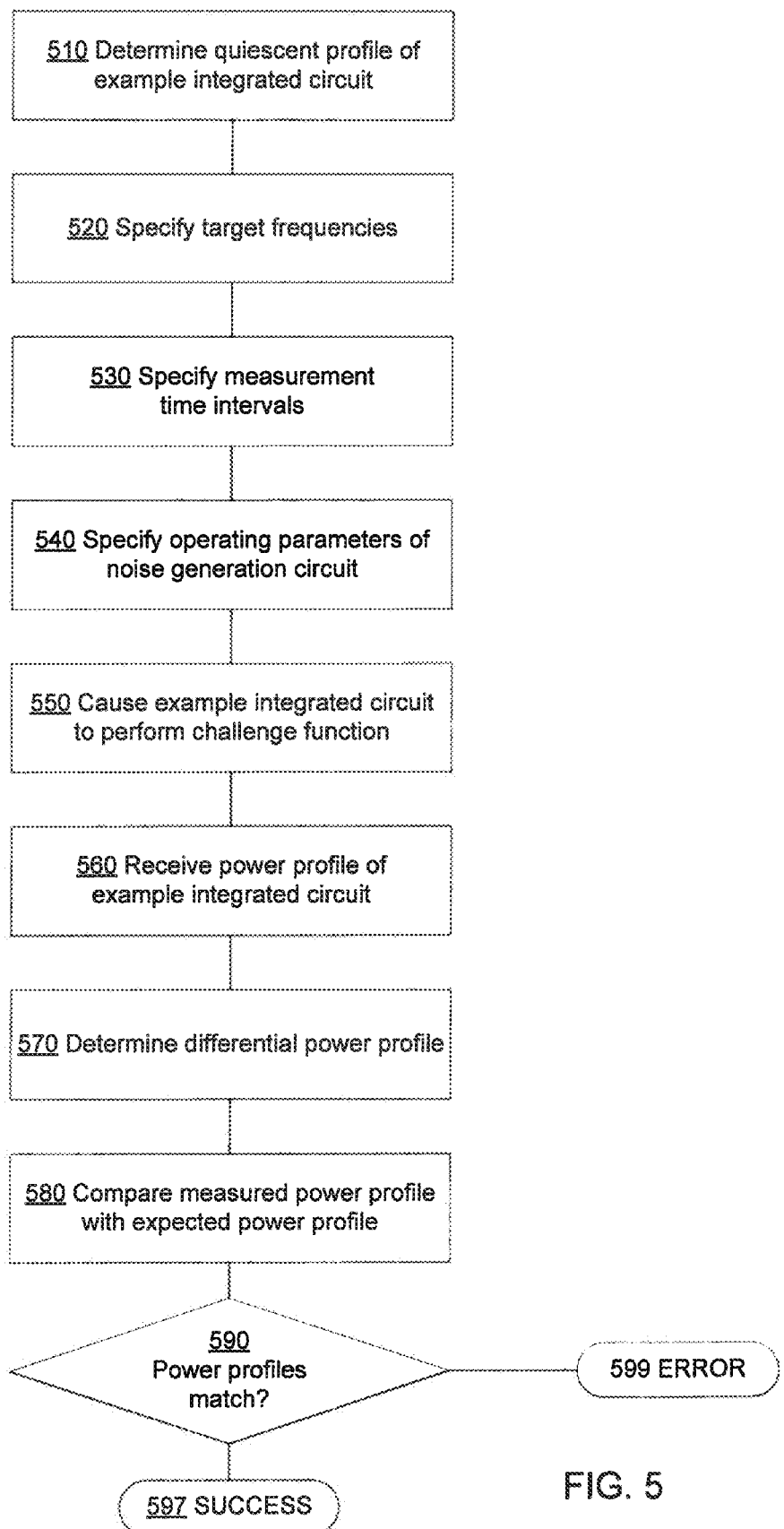
FIG. 5 depicts a flow diagram of an example method for authenticating an integrated circuit, in accordance with one or more aspects of the present disclosure.

FIG. 5 depicts a flow diagram of an example method 500 for authenticating integrated circuits in accordance with one or more aspects of the present disclosure. Method 500 and/or each of its individual functions, routines, subroutines, or operations may be performed to authenticate various integrated circuits, including memory devices (e.g., SRAM memory), devices implementing the functionality of external buses (e.g., an $I^2C$ bus), devices performing digital computation (e.g., cryptographic engines or microprocessors) and other devices.

Method 500 and/or each of its individual functions, routines, subroutines, or operations may be performed by one or more general purpose and/or specialized processing devices communicatively coupled to the integrated circuit being tested. Two or more functions, routines, subroutines, or operations of method 500 may be performed in parallel or in an order that may differ from the order described above. In an illustrative example, method 500 may be performed by a computing system 1000 described herein below with references to FIG. 6.

In certain implementations, method 500 may be performed by a single processing thread. Alternatively, method 500 may be performed by two or more processing threads, each thread executing one or more individual functions, routines, subroutines, or operations of the method. Method 500 could also be performed by a tester at an evaluation facility, or remotely across a network interface or in a hardware state machine. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other.

Referring to FIG. 5, at block 510, a processing device implementing the method may determine a quiescent power profile of the integrated circuit being tested. The quiescent power profile may comprise a plurality of steady-state voltages when no input signals or requests are applied to the functional units of the integrated circuits being tested, as described in more details herein above.

At block 520, the processing device may specify the target frequencies of the voltage measurement units of the integrated circuit being tested, for measuring the integrated circuit power profile. The target frequencies may be aligned with the operating frequencies of the functional units (e.g., one or more target frequencies of a voltage measurement unit may be selected to be multiples of the operational frequency of the corresponding functional unit).

At block 530, the processing device may specify the measurement time intervals of the voltage measurement units of the integrated circuit being tested, for measuring the integrated circuit power profile. The measurement time intervals of two or more voltage measurement units may be overlapping or non-overlapping, in order to produce a temporally distributed power profile of the integrated circuit being tested.

At block 540, the processing device may specify operating parameters of one or more noise generation units of the integrated circuit, as described in more details herein above.

At block 550, the processing device may cause an integrated circuit being tested to perform a certain challenge function. The challenge function may comprise a plurality of operations to be performed by one or more functional units of the integrated circuit. In an illustrative example, the challenge function may comprise a plurality of memory read/write operations utilizing one or more pre-defined data patterns and one or more pre-defined address patterns.

At block 560, the processing device may receive or acquire from the voltage measurement units a power profile of the integrated circuit being tested. The power profile may comprise values of voltages at a plurality of functional units of the integrated circuit at one or more frequencies over one or more periods of time, as described in more details herein above.

At block 570, the processing device may determine a differential power profile of the integrated circuit being tested. The differential power profile of the integrated circuit may be determined based on the quiescent point power profile and the actual measured distributed power profile, in order to eliminate variations of the power profile caused by variations of the outside temperature and power supply circuit.

At block 580, the processing device may compare the measured power profile with an expected power profile corresponding to a type of the integrated circuit. In an illustrative example, the measured power profile can be explicitly compared against a known authentic power profile. Alternatively, the comparison result can be combined with the underlying operation (e.g., the comparison value can be numerically combined into a challenge/response authentication algorithm). In certain implementations, the power profiling technique described herein may be combined with traditional authentication technologies, like cryptography. In an illustrative example, the values of the counters and the programming interface to the voltage measurement units may be cryptographically encrypted, or require a specific cryptographic sequence to access or program the voltage measurement units.

Responsive to determining, at block 590, that the measured power profile matches, within a pre-defined error margin, the expected power profile, the integrated circuit being tested may be assumed to be produced by the authorized facility using the authorized process, and the test of the integrated circuit may be completed successfully at block 597. Otherwise, at block 599 the integrated circuit being tested is assumed to be a counterfeit, and an error message may be signaled.

Responsive to completing operations corresponding to block 599, the method may terminate.

Figure 6:
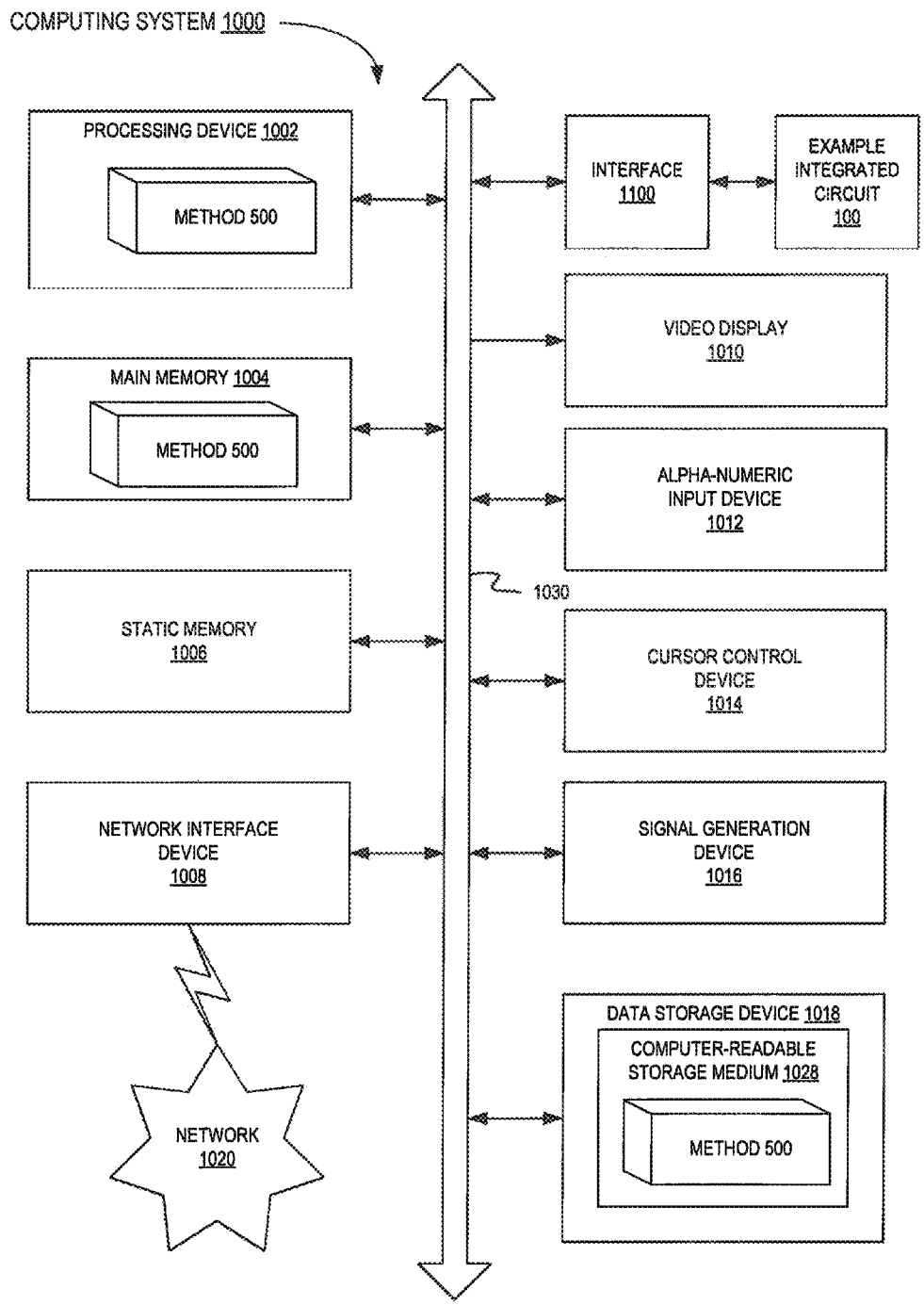
FIG. 6 illustrates a diagrammatic representation of an example computing system within which a set of instructions, for causing the computing system to perform the methods described herein, may be executed.

FIG. 6 illustrates a diagrammatic representation of a computing system 1000 within which a set of instructions, for causing the computing system to perform the methods described herein, may be executed. Computing system 1000 implementing the method 500 may be employed to authenticate various integrated circuits, including memory circuits (e.g., SRAM memory), devices implementing the functionality of external buses (e.g., an $I^2C$ bus), devices performing digital computation (e.g., cryptographic circuits, engines or processors) and other devices.

Computing system 1000 may be interfaced to the example integrated circuit 100 via various interfaces 1100, including, e.g., digital-to-analog and analog-to-digital converters and/or other suitable interfaces. In certain implementations, interfaces 1100 utilized to access the integrated circuit 100 may be cryptographically protected to ensure the integrity of test results.

Computing system 1000 may be connected to other computing systems in a LAN, an intranet, an extranet, and/or the Internet. The computing system may operate in the capacity of a server machine in client-server network environment. The computing system may be provided by a personal computer (PC), a set-top box (STB), a server, a network router, switch or bridge, or any machine capable of executing a set of instructions (sequential or otherwise) that specify actions to be taken by that machine. Further, while only a single computing system is illustrated, the term "computing system" shall also be taken to include any collection of computing systems that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute the method 500 for authenticating integrated circuits, in accordance with one or more aspects of the present disclosure for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of the method 500 for authenticating integrated circuits) implementing any one or more of the methods or functions described herein. Instructions implementing the method 500 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing systems that manipulates and transforms data represented as physical (electronic) quantities within the computing system's registers and memories into other data similarly represented as physical quantities within the computing system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose processing device selectively programmed by a computer program stored in the computing system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. An integrated circuit, comprising:
a plurality of functional units electrically coupled to a power source; and
an authenticating circuit comprising a plurality of voltage measurement units, each voltage measurement unit to measure, at one or more frequencies over one or more periods of time, a local voltage at a respective functional unit of the plurality of functional units;
wherein the authenticating circuit is to produce, using the plurality of voltage measurement units, a power profile of the integrated circuit corresponding to a challenge function to be performed by one or more functional units of the plurality of functional units.

2. The integrated circuit of claim 1, wherein each voltage measurement unit comprises a voltage-controlled oscillator (VCO) and a counter of voltage cycles produced by the VCO.

3. The integrated circuit of claim 1, wherein the functional units are spatially distributed over a die.

4. The integrated circuit of claim 1, wherein a first voltage measurement unit of the plurality of voltage measurement units is to measure a local voltage at a first functional unit of the plurality of functional units over a first period of time, and a second voltage measurement unit of the plurality of voltage measurement units is to measure a local voltage at a second functional unit of the plurality of functional units over a second period of time, the second period of time at least partially overlapping with the first period of time.

5. The integrated circuit of claim 1, wherein a first voltage measurement unit of the plurality of voltage measurement units is to measure a local voltage at a first functional unit of the plurality of functional units over a first period of time, and a second voltage measurement unit of the plurality of voltage measurement units is to measure a local voltage at a second functional unit of the plurality of functional units over a second period of time, the second period of time not overlapping with the first period of time.

6. The integrated circuit of claim 1, wherein the authenticating circuit is to further produce, using the plurality of voltage measurement units, an impedance profile of a power delivery system coupled to the power source, the impedance profile corresponding to a second challenge function to be performed by one or more functional units of the plurality of functional units.

7. The integrated circuit of claim 1, further comprising a noise generation circuit comprising a plurality of noise generation units, each noise generation unit electrically coupled to a respective functional unit of the plurality of functional units.

8. The integrated circuit of claim 1, wherein the challenge function comprises a plurality of memory read/write operations to be performed by the plurality of functional units utilizing pre-defined data patterns.

9. The integrated circuit of claim 1, wherein the challenge function comprises a plurality of memory read/write operations to be performed by the plurality of functional units utilizing pre-defined address patterns.

10. An integrated circuit, comprising:
a plurality of functional units electrically coupled to a power source; and
an authenticating circuit comprising a plurality of voltage measurement units, each voltage measurement unit to measure, at one or more frequencies over one or more periods of time, a local voltage at a respective functional unit of the plurality of functional units;

wherein the authenticating circuit is to produce, using the plurality of voltage measurement units, an impedance profile of a power delivery system coupled to the power source, the impedance profile corresponding to a challenge function to be performed by one or more functional units of the plurality of functional units.

11. The integrated circuit of claim 10, wherein each voltage measurement unit comprises a voltage-controlled oscillator (VCO) and a counter of voltage cycles produced by the VCO.

12. The integrated circuit of claim 10, wherein the functional units are spatially distributed over a die.

13. The integrated circuit of claim 10, wherein a first voltage measurement unit of the plurality of voltage measurement units is to measure a local voltage at a first functional unit of the plurality of functional units over a first period of time, and a second voltage measurement unit of the plurality of voltage measurement units is to measure a local voltage at a second functional unit of the plurality of functional units over a second period of time, the second period of time at least partially overlapping with the first period of time.

14. The integrated circuit of claim 10, wherein a first voltage measurement unit of the plurality of voltage measurement units is to measure a local voltage at a first functional unit of the plurality of functional units over a first period of time, and a second voltage measurement unit of the plurality of voltage measurement units is to measure a local voltage at a second functional unit of the plurality of functional units over a second period of time, the second period of time not overlapping with the first period of time.

15. The integrated circuit of claim 10, wherein the authenticating circuit is to further produce, using the plurality of voltage measurement units, a power profile of the integrated circuit corresponding to a second challenge function to be performed by one or more functional units of the plurality of functional units.

16. The integrated circuit of claim 10, further comprising a noise generation circuit comprising a plurality of noise generation units, each noise generation unit electrically coupled to a respective functional unit of the plurality of functional units.

17. The integrated circuit of claim 10, wherein the challenge function comprises a plurality of memory read/write operations to be performed by the plurality of functional units utilizing pre-defined data patterns.

18. The integrated circuit of claim 10, wherein the challenge function comprises a plurality of memory read/write operations to be performed by the plurality of functional units utilizing pre-defined address patterns.

19. An integrated circuit, comprising:
a plurality of functional units electrically coupled to a power source; and
an authenticating circuit comprising a plurality of voltage measurement units, each voltage measurement unit to measure, at one or more frequencies over one or more periods of time, a local voltage at a respective functional unit of the plurality of functional units;
wherein the authenticating circuit is to:
produce, using the plurality of voltage measurement units, a quiescent power profile representing steady-state voltages when no input signals are applied to the functional units;
produce, using the plurality of voltage measurement units, a response power profile of the integrated circuit corresponding to a challenge function performed by one or more functional units of the plurality of functional units; and
produce, based on the quiescent power profile and response power profile, a differential power profile of the integrated circuit.

20. The integrated circuit of claim 19, wherein the challenge function comprises a plurality of memory read/write operations to be performed by the plurality of functional units utilizing at least one of: a pre-defined data pattern or a pre-defined address pattern.

* * * * *